(12) United States Patent
Takahashi et al.

(10) Patent No.: US 9,614,467 B2
(45) Date of Patent: Apr. 4, 2017

(54) MOTOR CONTROL DEVICE

(71) Applicant: MITSUBISHI ELECTRIC CORPORATION, Chiyoda-ku (JP)

(72) Inventors: Kenji Takahashi, Chiyoda-ku (JP); Shinichi Furutani, Chiyoda-ku (JP); Naoto Norina, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/760,338

(22) PCT Filed: Oct. 30, 2013

(86) PCT No.: PCT/JP2013/079354
§ 371 (c)(1),
(2) Date: Jul. 10, 2015

(87) PCT Pub. No.: WO2014/141527
PCT Pub. Date: Sep. 18, 2014

(65) Prior Publication Data
US 2015/0357945 A1 Dec. 10, 2015

(30) Foreign Application Priority Data
Mar. 12, 2013 (JP) .................................. 2013-048626

(51) Int. Cl.
*H02P 23/14* (2006.01)
*H02P 6/00* (2016.01)
(Continued)

(52) U.S. Cl.
CPC ................ *H02P 6/002* (2013.01); *H02P 3/18* (2013.01); *H02P 23/14* (2013.01); *H02P 27/06* (2013.01); *H02P 29/032* (2016.02)

(58) Field of Classification Search
CPC ............. H02P 23/14; H02P 3/18; H02P 27/06
See application file for complete search history.

(56) References Cited

U.S. PATENT DOCUMENTS 6,232,729 B1    5/2001  Inoue
7,135,833 B2 *  11/2006  DeLange .................. G01J 1/04
                                                318/727
(Continued)

FOREIGN PATENT DOCUMENTS

JP    03-024155 B2   4/1991
JP    5-130707 A     5/1993
(Continued)

OTHER PUBLICATIONS

International Search Report issued Jan. 14, 2014 in PCT/JP2013/079354 filed Oct. 30, 2013.
(Continued)

*Primary Examiner* — Shawki S Ismail
*Assistant Examiner* — Muhammad S Islam
(74) *Attorney, Agent, or Firm* — Oblon, McClelland, Maier & Neustadt, L.L.P.

(57) ABSTRACT

The voltage amplification factor during rapid deceleration control of a motor is set to a value obtained by adding a first voltage amplification factor calculated with reference to the voltage of the DC circuit section of the inverter using a predetermined function and a low-pass filter and a second voltage amplification factor calculated with reference to the inverter current using a PI control. And both calculations are performed in parallel.

8 Claims, 5 Drawing Sheets

(51) Int. Cl.
*H02P 27/06* (2006.01)
*H02P 3/18* (2006.01)
*H02P 29/032* (2016.01)

(56) References Cited

U.S. PATENT DOCUMENTS

| | | | | |
|---|---|---|---|---|
| 7,459,879 | B2* | 12/2008 | Kezobo | B62D 5/046 318/727 |
| 2006/0113929 | A1* | 6/2006 | DeLange | G01J 1/04 318/63 |
| 2007/0216340 | A1* | 9/2007 | Iura | H02P 27/06 318/801 |
| 2009/0230903 | A1* | 9/2009 | Yamamoto | H02M 7/53875 318/400.3 |
| 2011/0279070 | A1* | 11/2011 | Tanaka | H02P 6/181 318/400.1 |
| 2012/0001587 | A1* | 1/2012 | Kono | 318/801 |
| 2012/0306426 | A1* | 12/2012 | Ikeda | H02P 5/52 318/609 |

FOREIGN PATENT DOCUMENTS

| | | |
|---|---|---|
| JP | 7-7981 A | 1/1995 |
| JP | 7-264709 A | 10/1995 |
| JP | 4461877 B | 5/2010 |
| JP | 2012-044835 A | 3/2012 |

OTHER PUBLICATIONS

Krause, P.C. et al., "Simulation of Symmetrical Induction Machinery," IEEE Transactions on Power Apparatus and Systems, vol. PAS-84, No. 11, Nov. 1965. pp. 1038-1053.

\* cited by examiner

MOTOR CONTROL DEVICE

TECHNICAL FIELD

The present invention relates to a motor control device that can rapidly decelerate or rapidly brake a motor, and more particularly to a control technology of rapidly increasing motor loss for achieving rapid deceleration or rapid braking. Hereinafter, the control of increasing the loss is simply referred to as rapid deceleration control.

BACKGROUND ART

An inverter is used as a power supply for a motor to generate a desired output and to rotate at a desired rotation speed. The inverter rectifies and converts power from a line power source to DC power and further converts the DC power to AC power having a voltage and a frequency suitable for driving the motor, to supply the converted power to the motor. A resistor for dissipating regenerated energy from the motor and the DC voltage smoothing capacitor are connected to the DC circuit section of the inverter. While variable speed operation of the motor entails regenerative operation during deceleration, connection of a mechanical load having a large moment of inertial to the motor or rapid deceleration of the motor steeply raises the voltage across the smoothing capacitor owing to regenerated energy. In particular, when the power rating of the resistor is insufficient, the voltage rise phenomenon is considerable. In order to prevent the device from damage due to the overvoltage of the DC circuit section during the regenerative operation of the motor, a motor control device is widely used that is equipped with an overvoltage protector that detects the voltage across the smoothing capacitor and automatically stops the deceleration operation when the detected voltage exceeds a predetermined value.

In such a motor control device, methods of suppressing the amount of regenerated energy returned to the inverter by increasing motor loss have been known as a way to achieve rapid deceleration without causing an overvoltage state of the DC circuit section of the inverter. For example, a method has been known in which the amplitude of voltage applied to the motor is amplified during deceleration to increase the current of the motor and the corresponding magnetic flux of the motor, whereby copper loss and iron loss of the motor is increased to increase the motor loss (see Patent Document 1).

In the technology disclosed in Patent Document 1, however, a current overshoot may occur immediately after the amplitude of voltage applied to the motor is amplified. There is a document that shows a measure against the current overshoot (see Patent Document 2). The document also discloses a technology of a rapid deceleration control of the motor, in which the rapid deceleration control is temporarily stopped to protect the motor and the inverter when a current overshoot, i.e., an overcurrent is detected. This suppresses amplification of the voltage amplitude during the rapid deceleration control of the motor, thereby preventing the overcurrent.

Generally, in generating a command duty, which corresponds to a command voltage, for the inverter, it is necessary to detect the voltage of the DC circuit section to divide the command voltage by the detected voltage. A method of detecting the voltage of the DC circuit section has been known in which variation of a transient voltage rise of the DC circuit section entailed by a rapid deceleration control is removed by changing the time constant of the filter for detecting the voltage of the DC circuit section during the rapid deceleration control. Using the method, a higher voltage can be applied to the motor while keeping the amplitude of the command duty, thus achieving the rapid deceleration control (see Patent Document 3).

PRIOR ART DOCUMENT

Patent Document

Patent Document 1: JP 1660499 B
Patent Document 2: JP 2012-044835 A
Patent Document 3: JP 4461877 B Non-Patent Document Non-Patent Document 1
Sugimoto, "Theory and Actual Design of AC Servo System", Sogo Denshi Publishing Co., 1997, p 106

SUMMARY OF THE INVENTION

Problem that the Invention is to Solve

According to the technology disclosed in Patent Document 1, amplitude of the voltage applied to the motor is amplified during a rapid deceleration control. However, simple amplification of the voltage amplitude may cause a current overshoot and an overcurrent, because the transfer function from voltage to current of the motor has a second-order characteristic and the attenuation coefficient decreases depending on motor parameters, such as an electrical time constant, and conditions such as of a rotational speed.

The technology disclosed in Patent Document 2 is that amplification of voltage amplitude is temporarily stopped when the current exceeds a predetermined value and an overcurrent is detected during the rapid deceleration control. However, the current overshoot cannot be suppressed in some cases only by simply stopping temporarily the amplification of voltage amplitude because of the motor characteristic described above. Further, the temporary stopping of the rapid deceleration control due to detection of an overcurrent and restart of the rapid deceleration control due to recovery from an overcurrent state may happen to be repeated, resulting in a situation that causes chattering and large fluctuations of the current. In such a situation, not only the overcurrent cannot be prevented but also the rapid deceleration control cannot be performed appropriately in some cases. Moreover, consideration is not taken into account at all for the voltage-amplitude amplification factor. As a result, when the voltage of the DC circuit section of the inverter is too high to accept the regenerated energy, the motor loss increases insufficiently and the smoothing capacitor accumulates the regenerated energy, causing an overvoltage of the DC circuit section of the inverter in some cases.

The technology disclosed in Patent Document 3 has a problem in that the voltage output from the inverter during the rapid deceleration control of the motor cannot be accurately determined and is uncontrollable. Consequently, a too much voltage happens to be applied to the motor depending on an operation condition, so that an excessive current passes through the motor, leading to damage or breakage of the motor and the inverter in some cases. The output voltage of the inverter is determined as the product of the voltage of the DC circuit section and the command duty for the inverter. Since the technology of Patent Document 3 uses a configuration in which the command duty for the inverter is not changed even during the rapid deceleration control, variation of output voltage of the inverter is determined by the voltage of the DC circuit section.

However, although various quantities such as electric circuit constants of the motor, the value of moment of inertia of the mechanical load, and the capacitance value of the smoothing capacitor are being determined, since the voltage of the DC circuit section is generated by non-linearity of overall phenomena such as due to the electric circuit of the motor, the torque train between the motor and a mechanical load, and charging/discharging of the smoothing capacitor of the inverter, variation of voltage rise during the rapid deceleration control of the motor cannot be accurately determined. Consequently, the variation of voltage rise of the DC circuit section becomes considerable depending on the operation condition, posing the problem of outputting a too much voltage as described above.

Moreover, it is difficult to determine in advance not only a peak value but also temporal variation in the voltage rising change of the DC circuit section during the rapid deceleration control of the motor, raising a problem in that the filter time constant for detecting the voltage of the DC circuit section is difficult to adjust. In order to suppress an overcurrent, a mechanism for adjusting amplitude of the command voltage by detecting the current is also included in the technology disclosed in Patent Document 3. However, since a multiplying operation of the DC circuit section voltage value, which is uncontrollable accurately, exists in the path of signal for adjusting the time constant, a problem has arisen that the gain of the overcurrent suppressing mechanism is difficult to adjust.

Solving the Problem

A motor control device according to the present invention comprises a motor deceleration controller for receiving a deceleration processing execution command to enable a deceleration control of a motor and a command voltage amplitude for an inverter, to control deceleration of the motor using the inverter, the motor deceleration controller including: an excitation controller for receiving the deceleration processing execution command and a voltage signal across a DC circuit section of the inverter, to calculate a first command voltage-amplitude amplification factor used for a rapid deceleration control of the motor; a current controller for receiving a motor current signal and an inverter current amplitude limit value that is a limit value of current applicable to the inverter, to calculate a second command voltage-amplitude amplification factor used for suppressing an overcurrent of the motor; an adder for adding the first command voltage-amplitude amplification factor and the second command voltage-amplitude amplification factor, to output a third command voltage-amplitude amplification factor used for the rapid deceleration control of the motor; and a multiplier for multiplying the command voltage amplitude by the third command voltage-amplitude amplification factor, to output the multiplied command voltage amplitude, wherein the inverter is controlled in accordance with the command voltage amplitude multiplied by the multiplier.

Advantages of the Invention

According to the present invention, since the command voltage-amplitude amplification factor is determined on the basis of the voltage of the DC circuit section of the inverter when the rapid deceleration is performed by amplifying the command voltage amplitude to increase motor loss during the deceleration control, regenerated energy returned to the DC circuit section of the inverter is appropriately suppressed, thus bringing about an effect of preventing an overvoltage. Moreover, since a current control is performed so that the motor current amplitude is restricted to within a limit value and is performed parallel to the amplification processing of the command voltage amplitude, the current amplitude is smoothly suppressed, thus bringing about an effect of stably achieving the rapid deceleration processing of the motor.

Furthermore, since no influence of non-linearity caused by the voltage of the DC circuit section intervenes in the control loop unlike the technology disclosed in Patent Document 3, design and adjustment of the control loop are easily performed, thus bringing about an effect of reducing effort required for the adjustment.

EMBODIMENTS FOR CARRYING OUT THE INVENTION

Figure 1:
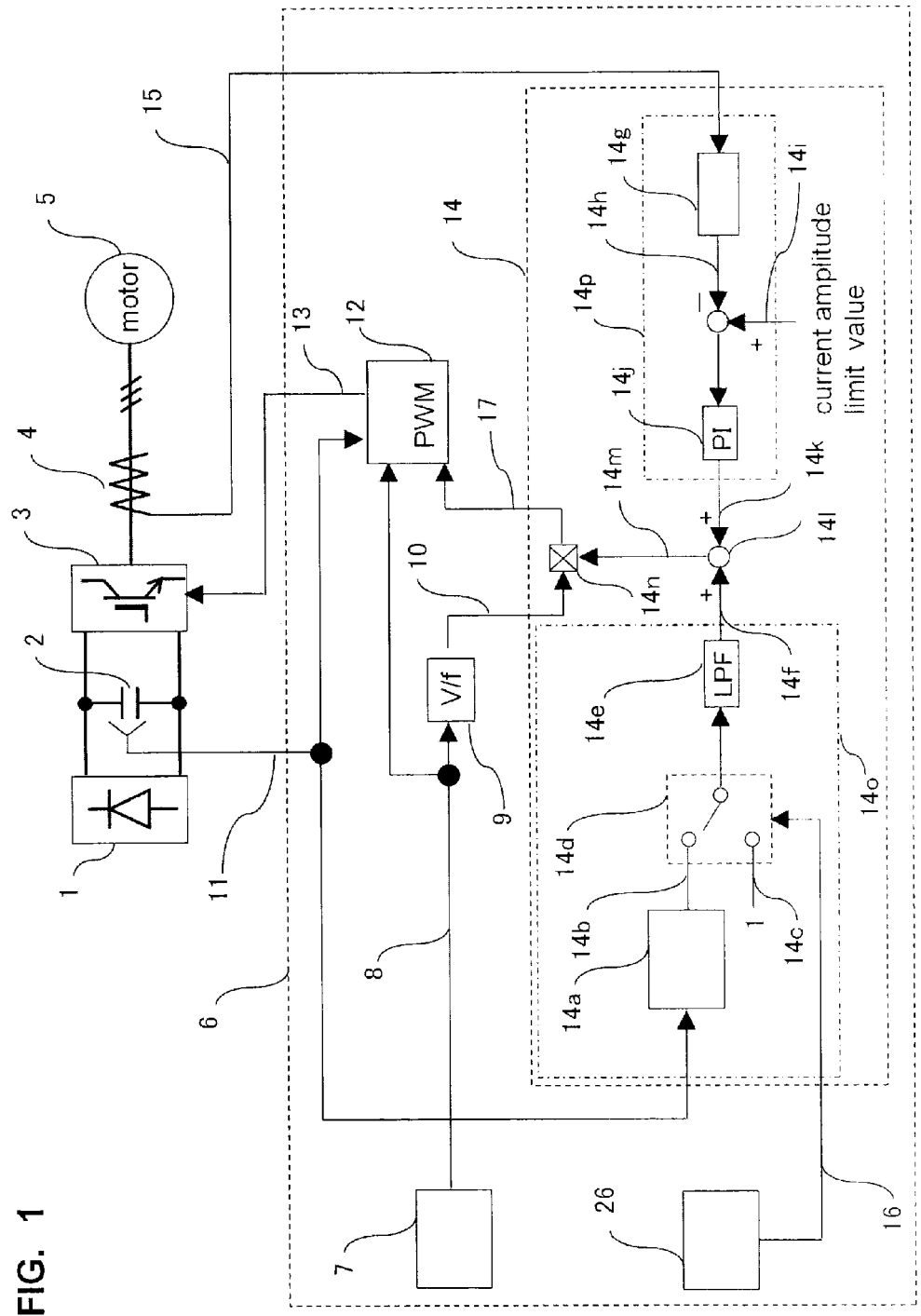
FIG. 1 is a diagram for explaining a device according to Embodiment 1 of the present invention.

Preferable embodiments for a motor control device according to the present invention will be described hereinafter with reference to the drawings. The same reference numerals in each drawing refer to identical or equivalent components. It should be noted that the present invention is not limited to the following embodiments.

Embodiment 1

Embodiment 1 of the present invention is described below with reference to the drawings. For convenience of explanation, an inverter, a motor, a current detector, and others are additionally depicted in the figure. While in the description here, the motor is assumed to be an induction motor and a V/f control that keeps constant the ratio between a command frequency and a command voltage amplitude for the motor is taken as an example, Embodiment 1 can be applied to other types of motors and control systems with no problems.

Referring first to FIG. 1, a DC power source 1 for outputting DC power is in many cases configured with a diode converter that is not capable of disposing of regenerated power. An inverter 3 converts the DC power from the DC power source 1 to supply AC power having an amplitude and a frequency suitable for driving a motor 5. A smoothing capacitor 2 smooths the voltage of a DC circuit section between the DC power source 1 and the inverter 3.

Next, a description is made of a motor control device 6 (indicated by the larger one of the dot-line boxes in the figure) used in the present invention. A command frequency 8 output from a command frequency generator 7 is input to a V/f converter 9, to be converted to a command voltage amplitude 10. A motor deceleration controller 14 (indicated by the smaller one of the dot-line boxes in the figure) performs, when the motor is rapidly decelerated from an operation according to the command voltage amplitude 10, a compensation processing that amplifies the command voltage amplitude 10, to output the an amplified command voltage amplitude 17. The compensation processing is performed only when the motor is rapidly decelerated. In normal situations, no compensation processing is performed, and the command voltage amplitude 10 and the command voltage amplitude 17 have the same value. A pulse width modulator (hereinafter abbreviated as a PWM modulator) 12 receives the command voltage amplitude 17 and the command frequency 8, to generate a command voltage and a command duty converted using a voltage signal 11 across the smoothing capacitor 2 (which is the same meaning as the voltage signal across the DC circuit section of the inverter; the same applies hereinafter), and further performs a PWM processing such as triangular wave comparison, to output a switching command 13.

Since the command duty here is generated using the voltage value of the DC circuit section, a voltage value obtained by averaging the output voltage of the inverter 3 over one triangular-wave cycle is equal to the command voltage. The command duty signifies an on-off ratio for switching elements of the inverter 3. Either voltage of a higher voltage side or a lower voltage side of the DC circuit section is output from output terminals of the inverter 3 by operation of the switching elements. That is, the command duty signifies a percent time of each of the output voltage values. The inverter 3 outputs a desired pseudo-voltage by varying the percent time of each output voltage value. If the voltage of the DC circuit section is being determined at this time, the percent time can be precisely determined. For example, an average output voltage over a time interval of about one triangular wave cycle can be brought into accordance with a command voltage. Specific mathematical expressions are as follows:

$$\theta = \int f * dt, \quad (1)$$

$$V_u^* = V_{amp}^{\cdot *} \cdot \cos\theta, \quad (2)$$

$$V_v^* = V_{amp}^{\cdot *} \cdot \cos\left(\theta - \frac{2\pi}{3}\right), \quad (3)$$

$$V_w^* = V_{amp}^{\cdot *} \cdot \cos\left(\theta + \frac{2\pi}{3}\right), \quad (4)$$

$$D_u^* = V_u^* \cdot \frac{2}{V_{dc}}, \quad (5)$$

$$D_v^* = V_v^* \cdot \frac{2}{V_{dc}}, \quad (6)$$

and $$D_w^* = V_w^* \cdot \frac{2}{V_{dc}}, \quad (7)$$

where f* corresponds to the command frequency 8; and θ represents a command voltage phase; Vamp*, a command voltage amplitude 17; Vu*, a U-phase command voltage; Vv*, a V-phase command voltage; Vw*, a W-phase command voltage; and Du*, a U-phase command duty; Dv*, a V-phase command duty; Dw*, a W-phase command duty. The inverter 3 operates power conversion in accordance with the switching command 13. The operations of each component described above are very standard; hence detailed explanations thereof are omitted.

Next, the motor deceleration controller 14 during a rapid deceleration control of the motor is described in detail. First, a command voltage amplifying mechanism for the rapid deceleration of the motor is described. A before-filtered command voltage-amplitude amplification factor A1 (14b) for the rapid deceleration control is calculated from the voltage signal 11 across the DC circuit section of the inverter using a command voltage-amplitude amplification-factor setting function 14a. A command voltage-amplitude amplification factor 14c is a before-filtered command voltage-amplitude amplification factor A2 for no rapid deceleration control and has a value of one. A selector 14d selects the before-filtered command voltage-amplitude amplification factor A1 (14b) when receiving a deceleration processing execution command 16, i.e., when the rapid deceleration control is enabled, or selects the before-filtered command voltage-amplitude amplification factor A2 (14c) when the rapid deceleration control is disabled, to output the selected amplification factor.

Note that in Embodiment 1, a configuration is used such that the deceleration processing execution command 16 is output from a deceleration processing execution command output component 26. As a situation needing the rapid deceleration control of the motor, occurrence of an undesirable event due to continuous operation of the motor is presumed, such as a malfunction of the inverter, that of the motor control device itself, and a fault of a mechanical load connected to the motor. The deceleration processing execution-command output component 26 judges such a situation, to output the deceleration processing execution command 16. In addition, a configuration may be used such that the deceleration processing execution command 16 is output when receiving a command to stop the motor from outside the motor control device through communication. Note that a specific method of the judgment and details thereof are not essential to the present invention, the explanation thereof is omitted.

A low-pass filter (LPF) 14e has a function of suppressing a steep change of the command voltage-amplitude amplification factor output from the selector 14d, due to the operation of the selector 14d entailed by the start of the rapid deceleration control of the motor, and of outputting a first command voltage-amplitude amplification factor (141). This brings about an effect of suppressing a disturbance such as an overshoot of the motor current, as described in the paragraphs of "Problem that the Invention is to Solve". The low-pass filter may have any order or the like as long as its cutoff frequency value is set so that resonant frequency components due to the second-order transfer function from voltage to current of the motor are sufficiently removed.

By calculating in this way the command voltage-amplitude amplification factor on the basis of the voltage signal 11 across the DC circuit section of the inverter using an excitation controller 14o indicated as a whole by the dot-dash line box on the left side of FIG. 1, the rapid deceleration control of the motor can be achieved in response to the voltage of the DC circuit section of the inverter. For example, when the voltage of the DC circuit section is close to an overvoltage level with little margin, the command voltage-amplitude amplification factor is quickly increased to increase the motor current and increase consumption of the regenerated energy in the motor, whereby the overvoltage of the DC circuit section is prevented. Since voltage ranges of use for parts constituting the inverter are prescribed, such an overvoltage would lead to damage and breakage of the parts. Suppressing the overvoltage can prevent deterioration and breakage of the inverter constituting parts.

Figure 2:
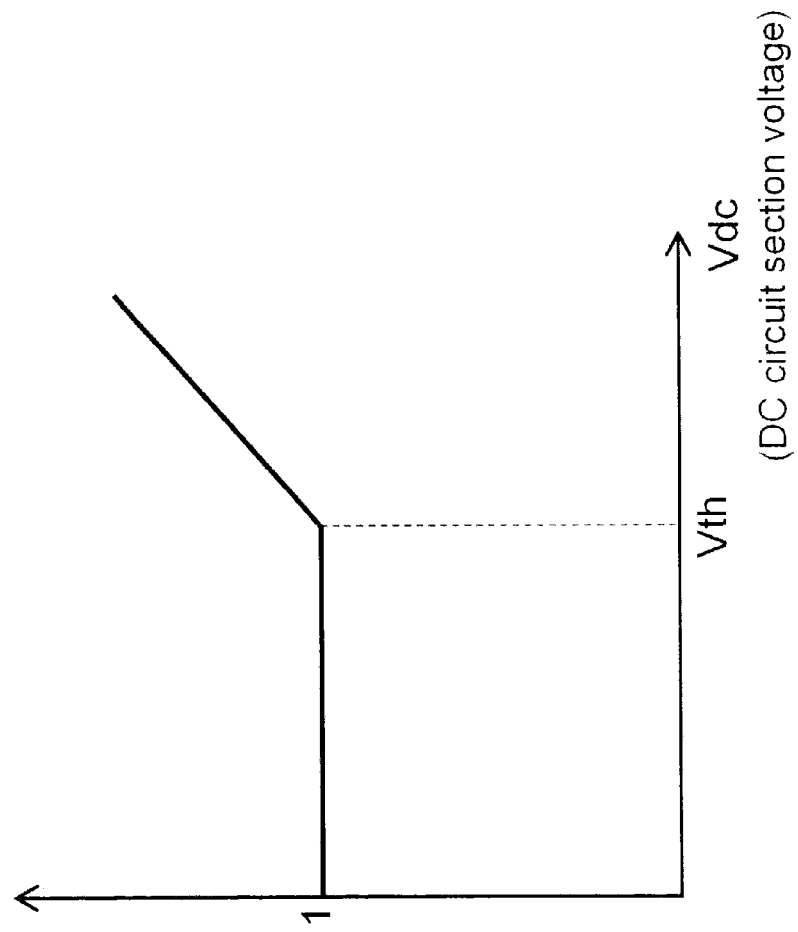
FIG. 2 is a graph showing an example of a calculation method for a first command voltage-amplitude amplification factor in Embodiment 1 of the present invention.

An example of a characteristic of the command voltage-amplitude amplification-factor setting function 14a for such an overvoltage is shown in FIG. 2. The horizontal axis corresponds to the voltage Vdc (11) of the DC circuit section of the inverter as the input and the vertical axis corresponds to the before-filtered command voltage-amplitude amplification factor A1 (14b) as the output. When Vdc exceeds a threshold voltage Vth, the command voltage-amplitude amplification factor is increased. Further, the increase is made linearly with the voltage Vdc of the DC circuit section of the inverter. This allows the command voltage amplitude 17 to be quickly amplified in response to the voltage Vdc, thereby bringing about the effect of reliably preventing the above-described overvoltage.

Next, a motor overcurrent suppressing mechanism in the deceleration controller 14 of the motor is described in detail below as an operation of a motor current controller 14p indicated by the dot-dash line box on the right side of FIG. 1. A current amplitude signal 14h is calculated by a current amplitude calculator 14g for calculating an amplitude of the motor current signal from a detected current signal 15 output from a current detector 4. While there are some calculation methods, the current amplitude signal can be calculated by, for example, the following equations:

$$i_\alpha = \sqrt{\frac{2}{3}} \left( i_u - \frac{1}{2} i_v - \frac{1}{2} i_w \right), \tag{8}$$

$$i_\beta = \sqrt{\frac{1}{2}} (i_v - i_w), \tag{9}$$

and $$i_{amp} = \sqrt{\frac{2}{3}} \sqrt{i_\alpha^2 + i_\beta^2}, \tag{10}$$

where $i_u$, $i_v$, $i_w$ corresponds to the detected current signal 15 and $i_{amp}$ represents a current amplitude corresponding to the current amplitude signal 14h; and $i_\alpha$, $i_\beta$ represent an α-directional and a β-directional components on the two-phase stationary coordinate (α, β), respectively.

Figure 3:
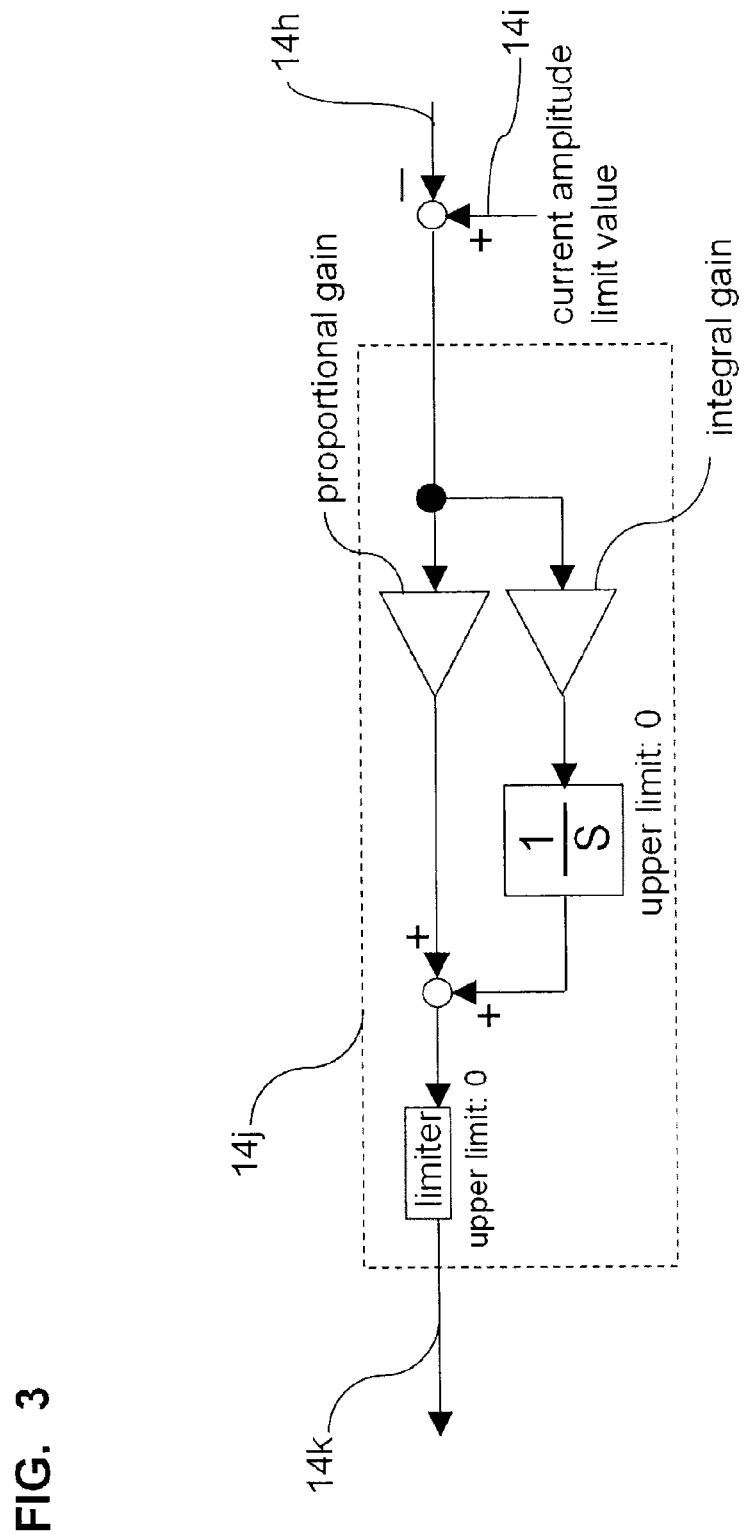
FIG. 3 is a diagram showing an example of a calculation method for a second command voltage-amplitude amplification factor in Embodiment 1 of the present invention.

A PI controller 14j receives the difference between the current amplitude signal 14h and a current amplitude limit value 14i, to output a second command voltage-amplitude amplification factor (14k). The PI controller is provided for preventing an overcurrent of the motor, and has an integrator and a limiter whose upper limit is zero for an output of the PI controller so as not to operate below the current amplitude limit value. Accordingly, when the current amplitude signal 14h is smaller than the current amplitude limit value 14i, the second command voltage-amplitude amplification factor (14k) becomes zero. Summarizing the above, a configuration of the PI controller is as shown in FIG. 3. The PI controller thus controls directly the current amplitude to restrict it, bringing about an effect of reliably suppressing the overcurrent.

The first command voltage-amplitude amplification factor (14f) and the second command voltage-amplitude amplification factor (14k) thus calculated are added by an adder 14l, to obtain a third command voltage-amplitude amplification factor (14m). Then, the command voltage amplitude 10 is multiplied by the third command voltage-amplitude amplification factor (14m), to obtain the command voltage amplitude 17. In this way, by parallelly and simultaneously performing the control for rapid deceleration of the motor and the control for suppressing the overcurrent of the motor, the rapid deceleration control of the motor can be smoothly and stably achieved without occurrence of chattering and the like.

Finally, a description is made of a design and adjustment of the gain in the motor deceleration controller 14 described above. In the motor deceleration controller 14 according to the present invention, since the motor overcurrent suppressing mechanism is a system in which a current value of the motor is fed back to adjust the voltage to be applied to the motor, the system exhibits a phenomenon having such a time constant of the order of several tens Hz to several kHz as with the electric circuit.

In the command voltage amplifying mechanism for the rapid deceleration of the motor, the following phenomena occur in order: variation of the voltage applied to the motor→variation of the motor current→variation of the motor input power→variation of power in the smoothing capacitor→variation of the voltage of the DC circuit section . . . , i.e., the variation of the motor current is directly linked with the variation of the motor input power. With all things considered, a fastest phenomenon among the individual phenomena has a time constant of the order of that the electric circuit has. Thus, for a design of a stable control system, attention may be focused on the order of the electric circuit time constant.

Generally, there is a large difference in the order of time constants between an electric circuit and a mechanical torque train of a motor. For example, a transfer function from voltage applied to the motor to current of the motor has a first-order lag characteristic, and a time constant $T_{cst\_ele}$ of the current variation is expressed with a primary resistance and a primary leakage inductance using the induction motor parameters written in the Non-Patent Document 1 and has a value of 0.00853 [sec], as shown by Eq. (11):

$$T_{cst\_ele} = \frac{\sigma \cdot L_s}{R_s} = \frac{0.121 \cdot 28.7[\text{mH}]}{0.407[\Omega]} = 0.00853[\text{sec}], \tag{11}$$

where σ is a leakage coefficient; $L_s$, a primary inductance; and $R_s$, a primary resistance. This value means a time for the motor current to reach about 63 [%] of its saturation value when a step voltage is input to the electric circuit of the motor. On the other hand, the frequency transfer function from the motor torque to the motor rotational speed has an integral characteristic. Although a simple comparison cannot be made, when the motor is accelerated at a constant rated torque up to a rated speed against the mechanical moment of inertia of the motor alone, a time $T_{cst\_mec}$ for the motor to be accelerated to 63 [%] of the rated speed is 0.11236 [sec], as shown by Eq. (12):

$$T_{cst\_mec} = \tag{12}$$
$$0.63 \cdot \frac{W_r}{T_q/J_m} = 0.63 \cdot \frac{1000[rpm] \cdot 0.0179[\text{kgm}^2]}{10.51[\text{Nm}]} = 0.1124[\text{sec}],$$

where $W_r$ is the rated speed; $T_q$, the rated torque; and $J_m$, the mechanical moment of inertia. Accordingly, the motor rotational speed and the command frequency can be regarded as constants because they vary more slowly compared to the electric circuit. Utilizing the slower variation, a linear approximation modeling can be applied to the motor deceleration controller 14, the motor, the voltage of the DC circuit section and the like, thereby easily designing the control system. Note that the rated speed is converted to a unit of angular frequency [rad/sec] in the calculation of Eq. (12).

Figure 4A:
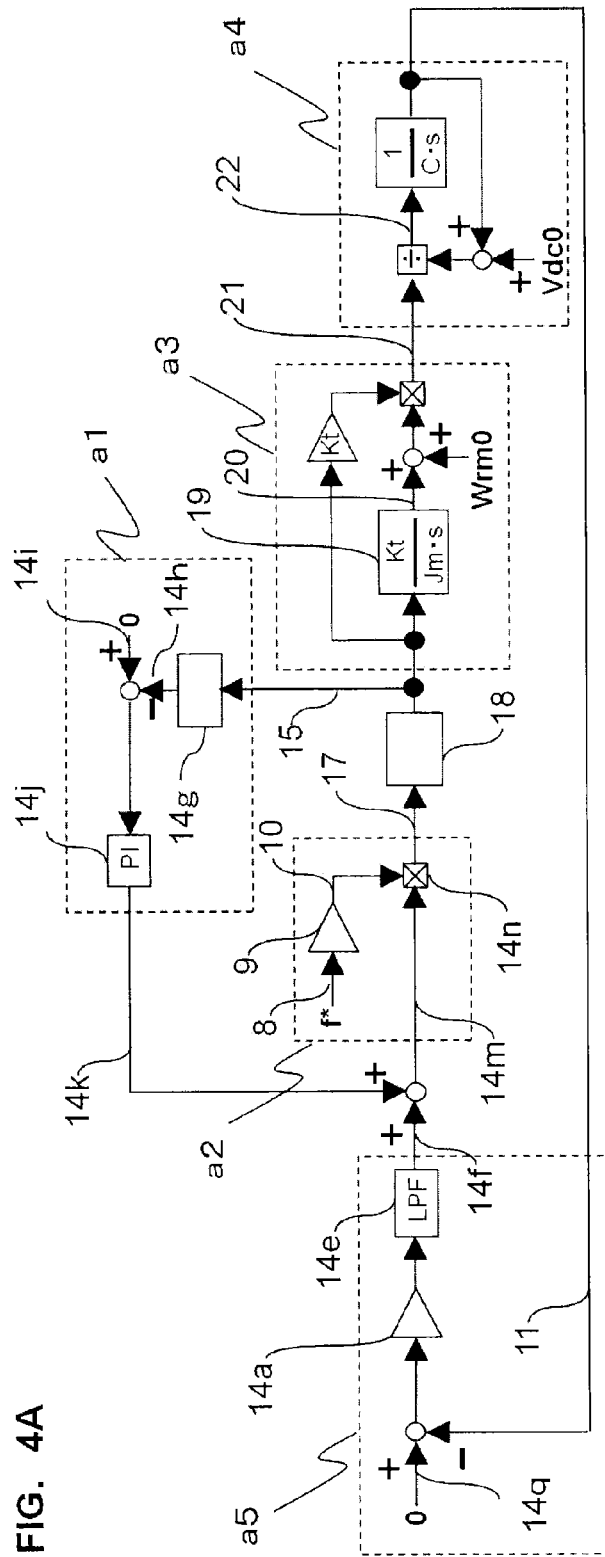
FIG. 4A and FIG. 4B are model diagrams for designing a control system according to Embodiment 1 of the present invention.
Figure 4B:
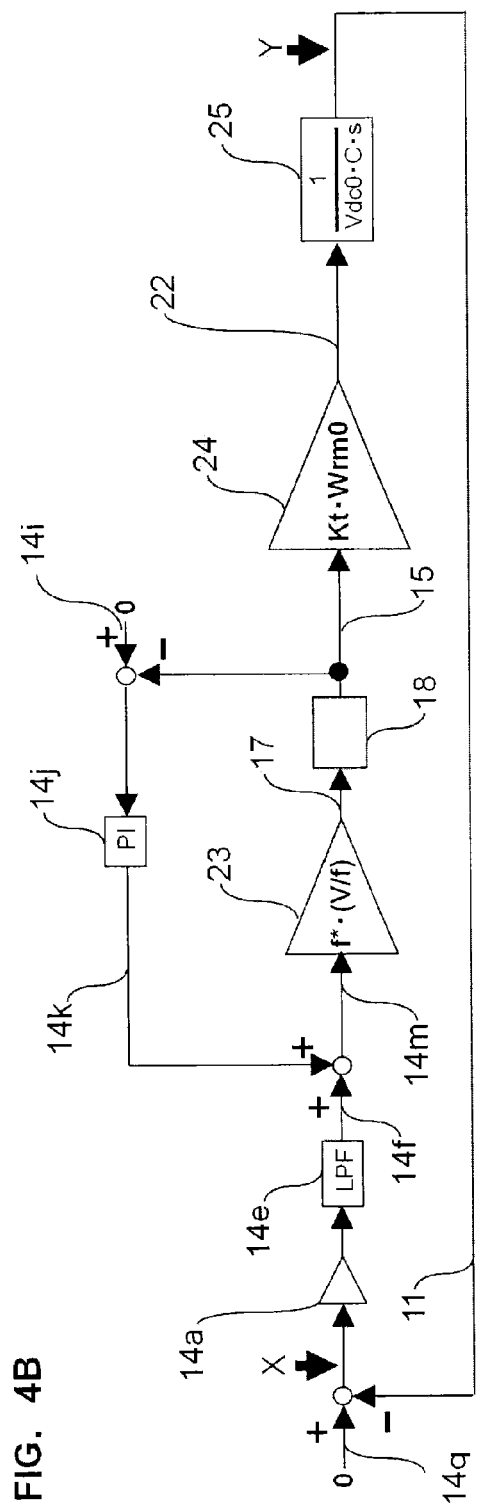

FIG. 4 (FIG. 4A and FIG. 4B) show the modeling in detail, i.e., a model for perturbations of each physical quantity around an operating point. In FIG. 4, a motor rotational speed Wrm0 and a voltage Vdc0 of the smoothing capacitor 2 in the DC circuit section of the inverter are at the operating point. Note that while the voltage Vdc0 denotes the same physical quantity as the voltage Vdc (11) of the DC circuit section of the inverter, values around the operating point need to be expressed distinguishably for convenience of analysis. For this reason, these values are expressed by attaching the suffix "0". A control system is ordinarily designed by focusing on perturbations of each physical quantity around an operating point; hence the motor control system is designed on the basis of FIG. 4. Since components and signals in FIG. 4 designated at the same reference numerals as those in FIG. 1 provide the same respective workings, explanations thereof are omitted here. As described above, FIG. 4 are aimed at analyzing the perturbations of each physical quantity and each signal in the motor, the inverter, and the control system. Note that the inverter 3 is omitted from FIG. 4 assuming that it outputs a voltage in accordance with the command voltage, because the inverter 3, except for the smoothing capacitor 2 in the DC circuit section, has no temporal characteristic (transient characteristic) and exerts no essential effect on the analysis in FIG. 4. In the following description, the term "perturbation" with parentheses is appended.

In FIG. 4A, a component a1 enclosed by a dot-line box represents the motor current controller 14$p$ in the motor deceleration controller 14. The current amplitude limit value 14$i$ here corresponds to a command target value for the PI controller 14$j$. Since major signals to be handled are perturbation signals, designing the control system for each signal in the control feedback loop to converge to zero allows for ensuring stability of the control system. Note that the current amplitude limit value 14$i$ here, the command target, is simply set to zero, because it is a signal causing no perturbation. The set value of the command target exerts no essential effect on the design of the control system.

A component a2 enclosed by a dot-line box in FIG. 4A represents multiplication of the third command voltage-amplitude amplification factor (perturbation) 14$m$ and the command voltage amplitude 10 converted by the V/f conversion means. While the induction motor in FIG. 1 is shown as an example of the component connected to the inverter, since the induction motor in FIG. 4 is a constituent component for the analysis, a circuit model 18 of the induction motor is introduced in FIG. 4. A circuit equation for the circuit model 18 of the induction motor is expressed in a vector form by Eq. (13):

$$\begin{bmatrix} I'_s \\ 0 \end{bmatrix} = \begin{bmatrix} (R_s + p \cdot \sigma \cdot L_s)I + (\omega \cdot \sigma \cdot L_s)J & \left(p \cdot \frac{M}{L_r}\right)I + \left(\omega \cdot \frac{M}{L_r}\right)J \\ \left(-\frac{M \cdot R_r}{L_r}\right)I & \left(\frac{R_r}{L_r} + p\right)I + (\omega_{se})J \end{bmatrix} \begin{bmatrix} i_s \\ \Phi_r \end{bmatrix}, \quad (13)$$

where I and J are expressed by the following Eq. (14):

$$I = \begin{bmatrix} 1 & 0 \\ 0 & 1 \end{bmatrix}, J = \begin{bmatrix} 0 & -1 \\ 1 & 0 \end{bmatrix}; \quad (14)$$

and $R_s$ is the primary resistance; σ, the leakage coefficient; $L_s$, primary inductance; M, mutual inductance; p, a differential operator; $L_r$, secondary inductance; $R_r$, secondary resistance; $V_s$, primary voltage; $i_s$, primary current; $\Phi_r$, secondary magnetic flux; co, an electrical angular frequency; and $\omega_{se}$, a slip frequency.

Since an ordinary time constant of secondary magnetic flux is very large, it is sufficient to focus on only primary circuit. Hence, the circuit equation reduces to Eq. (15):

$$V_s = \{(R_s + p \cdot \sigma \cdot L_s)I + (\omega \cdot \sigma \cdot L_s)J\} \cdot i_s \quad (15)$$

Expressing Eq. (15) on dq-axes (coordinate axes of a synchronously rotating coordinate frame generally used in controlling an AC motor such as an induction motor and a synchronous motor), the respective components are expressed by Eq. (16):

$$\begin{bmatrix} V_{ds} \\ V_{qs} \end{bmatrix} = \begin{bmatrix} R_s + p \cdot \sigma \cdot L_s & -\omega \cdot \sigma \cdot L_s \\ \omega \cdot \sigma \cdot L_s & R_s + p \cdot \sigma \cdot L_s \end{bmatrix} \begin{bmatrix} i_{ds} \\ i_{qs} \end{bmatrix}. \quad (16)$$

Further, taking the direction of the secondary magnetic flux as the d-axis, a principal component of voltage of the induction motor coincides with the q-axis orthogonal to the d-axis in many cases, so that adjustment of a voltage amplitude signal (perturbation) 17 under the condition of the secondary magnetic flux being established corresponds to adjustment of a voltage in the q-axis direction. With this coordinate transformation, a current (perturbation) 15 also coincides with a q-axis component.

Thus, focusing on the relationship between the q-axis-component voltage and the q-axis-component current in Eq. (16), the circuit model 18 of the induction motor in FIG. 4A is expressed in a transfer function form by Eq. (17);

$$i_{qs} = \frac{1}{\sigma \cdot L_s} \frac{\left(s + \frac{R_s}{\sigma \cdot L_s}\right)}{\left(s + \frac{R_s}{\sigma \cdot L_s}\right)^2 + \omega^2} \cdot V_{qs}, \quad (17)$$

where s is a Laplace variable.

A component a3 enclosed by a dot-line box in FIG. 4A represents a torque train between the motor and a mechanical load, where Kt is a torque constant; Jm, a moment of inertia of the motor and the mechanical load; Wrm0, a motor rotational speed at the start of the deceleration control of the motor. A mechanical model 19 has an integral characteristic, and receives the current (perturbation) 15 to output a motor rotational speed (perturbation) 20. Neglecting the motor loss, motor input power (perturbation) 21 corresponds to mechanical motor output. This is the product of the motor torque and summation of the motor rotational speed (perturbation) 20 and the motor rotational speed Wrm0.

A component a4 enclosed by a dot-line box in FIG. 4A represents a model of the smoothing capacitor 2 in the DC circuit section, and the model represents variation of voltage of the DC circuit section of the inverter caused by the motor input power (perturbation) 21. Since the voltage of the smoothing capacitor 2 has a characteristic corresponding to integration of the current flowing into the smoothing capacitor 2, if the current flowing into the smoothing capacitor 2 is calculated, the voltage of the smoothing capacitor 2 can be calculated. In FIG. 1, the current flowing into the smoothing capacitor 2 is generally a resultant current for the motor 5 modulated by operation of the switching elements of the inverter 3; however, the resultant current is difficult to handle in detail because it contains components having a frequency twice that of the triangular waves in the PWM processing. Hence, focusing on power flowing into the smoothing capacitor 2, a substitution is made for the resultant current by dividing the power by the voltage of the smoothing capacitor 2. Based on the substitution, a smoothing capacitor current (perturbation) 22 is calculated by dividing the motor input power (perturbation) 21 by the voltage of the DC circuit section of the inverter and converted to a voltage signal (perturbation) 11 across the DC circuit section of the inverter using the integral characteristic of the smoothing capacitor. The voltage of the DC circuit section of the inverter used in the division is summation of the voltage Vdc0 of the smoothing capacitor at the start of the rapid deceleration control of the motor and the voltage signal (perturbation) 11 across the DC circuit section of the inverter.

A component a5 enclosed by a dot-line box in FIG. 4A represents the excitation control controller 14o in the motor deceleration controller 14. The component a5 is configured such that it receives the feedback of the voltage signal (perturbation) 11 across the DC circuit section of the inverter and takes the difference between values of the feedback signal and a given command (14q), to output a first command voltage-amplitude amplification factor (perturbation) 14f. Since the command 14q, which is a command for the voltage signal (perturbation) 11 across the DC circuit section of the inverter, is a signal that is undesired to have a perturbation, the value of the command 14q here is simply set to zero as with them component a1 in FIG. 4A.

FIG. 4B is a diagram showing a result of linear approximation of FIG. 4A. The part corresponding to the component a2 enclosed by the dot-line box in FIG. 4A is expressed as a gain 23 in multiplication of a command frequency f* at the start of the rapid deceleration control of the motor and a V/f conversion coefficient because the command frequency 8 is regarded as a constant value. Likewise, the part corresponding to the component a3 enclosed by the dot-line box in FIG. 4A is expressed as a gain 24 in multiplication of the torque constant Kt and the motor rotational speed Wrm0 at the start of the rapid deceleration control of the motor because the motor rotational speed (perturbation) 20 is negligible small under the assumption that the frequency is the order of the electric circuit time constant.

Furthermore, in the part corresponding to the component a4 enclosed by the dot-line box in FIG. 4A, if the smoothing capacitor has a sufficiently large capacitance, the charging voltage of the smoothing capacitor at the start of the rapid deceleration control of the motor, i.e., the voltage Vdc0 of the DC circuit section of the inverter is sufficiently larger than that of the voltage signal (perturbation) 11 across the DC circuit section of the inverter in many cases. Hence, no division operation involving the voltage signal (perturbation) 11 is substantially needed. This simplifies the voltage model of the DC circuit section to a simple combination of an integrator and a gain as expressed by the rightmost block 25 in FIG. 4B.

In addition, since a current amplitude signal (perturbation) 14h fed back to the motor overcurrent suppressing mechanism of the component a1 enclosed by the dot-line box in the motor deceleration controller 14 in FIG. 4A is a perturbation signal, the current amplitude signal is substantially equivalent to the current signal (perturbation) 15. Summarizing the above, FIG. 4A is simplified to FIG. 4B by the linear approximation.

As described above, FIG. 4B is a model for handling the perturbations and the linear approximation of the model shown in FIG. 4A around a given operating point. As seen from FIG. 4B, since the linear approximation model is configured with linear function blocks such as the gains and the integrators, a generally used transfer-function based classical theory can be applied to the design of the motor control. For example, it is conceivable to design the gain of the PI controller 14j and finely adjust the cut-off frequency of the low-pass filter 14e so that the gain margin and phase margin fall within the prescribed proper ranges, by calculating the open loop transfer characteristic between the points X and Y in FIG. 4B. Thus, the motor deceleration control controller 14 according to the present invention allows for proper evaluation of operation of the overall system, compared to the technology disclosed in Patent Document 3, and has the merit of facilitating the design and the adjustment if various quantities such as the electric circuit constants of the motor, the value of moment of inertia of the mechanical load, and the capacitance value of the smoothing capacitor are being determined.

In addition, the command voltage-amplitude amplification facto A1 (Ga1) is set to increase linearly when the voltage of the DC circuit section exceeds the threshold voltage Vth, as shown in FIG. 2. This quickly amplifies the command voltage and thereby brings about an effect of suppressing an overvoltage of the DC circuit section by increasing the motor loss as described before, and further brings about an effect of facilitating the gain design of the control system. While there is the integrator emulating the transfer characteristic of the voltage of the DC circuit section between the point Y and the gain of the torque train between the motor and the mechanical load in FIG. 4B, the integrator here has the inverse of the voltage Vdc0 of the DC circuit section as a coefficient. In other words, the open loop transfer characteristic from the point X to the point Y is varied with the value of the voltage of the DC circuit section. However, by increasing the command voltage-amplitude amplification factor A1 in response to the DC circuit section voltage as shown in FIG. 2 by the command voltage-amplitude amplification-factor setting function 14a shown in FIG. 4B, the inverse characteristic of Vdc0 in the integrator can be cancelled out. This keeps constant the characteristic of the open loop in FIG. 4B even when the voltage of the DC circuit section varies, thus bringing about an effect of easily adjusting the gain of the control system.

The motor rotational speed (expressed as Wrm0 in FIG. 4) at the start of the rapid deceleration control of the motor may be employed as a value for the reference of the control system design as described before. The reason for this is as follows. At the start of the rapid deceleration control of the motor, the mechanical rotational energy of the motor is large and the regenerated energy returned to the inverter is large. This will result in occurrence of an overvoltage and an overcurrent if nothing is contrived for the energy. Hence, a design targeting the operation at this start timing can prevent the overvoltage of the DC circuit section and the overcurrent of the inverter. The spec value of maximum rotational speed of the motor may also be employed as a design reference. In this case, an overvoltage and an overcurrent can be prevented more reliably. Since the motor control device of Embodiment 1 is configured to perform the V/f control for the induction motor, the command frequency 8 can be substituted for the motor rotational speed. Likewise, the voltage Vdc0 of the DC circuit section of the inverter may be set to a value at the start of the rapid deceleration control of the motor.

As also seen from FIG. 4B, the value of the moment of inertia (Jm), the parameter for the mechanical torque train is not used in designing the control system of the motor deceleration controller 14. This brings about a merit of eliminating the need for adjustment work according to the value of moment of inertia, which work is necessary in the technology disclosed in Patent Document 3.

As has been described above, according to the present invention, when the rapid deceleration is performed by amplifying the command voltage amplitude to increase the motor loss during the deceleration control, the command voltage-amplitude amplification factor is determined on the basis of the voltage of the DC circuit section of the inverter to appropriately suppress regenerated energy returned to the inverter DC circuit section, thus bringing about an effect of preventing an overvoltage. Moreover, since the current is controlled so that the motor current amplitude is within a limit value and the control is performed parallel to the command voltage amplification processing, the current amplitude is smoothly suppressed, thereby bring about an effect of stably achieving the rapid deceleration processing of the motor.

Furthermore, since no influence of non-linearity caused by the voltage of the DC circuit section intervenes in the control loop unlike the technology disclosed in Patent Document 3, the control loop can be easily designed and adjusted, thus bringing about an effect of reducing effort required for the adjustment.

Embodiment 2

While in Embodiment 1, the values of motor rotational speed and voltage of the DC circuit section at the start of the rapid deceleration control of the motor are employed in the design model as shown in FIG. 4B, the design model may be configured such that a rotational speed to be employed is appropriately changed depending on the motor rotational speed. In particular, since the product (24) of the torque constant Kt and the motor rotational speed Wrm0 is a direct gain as shown in FIG. 4B, the gain for the control target is reduced when the motor rotational speed decreases. Likewise, by also changing appropriately the voltage Vdc0 of the DC circuit section of the inverter depending on a voltage value during the rapid deceleration control of the motor, the rapid deceleration control of the motor can be quickly achieved while preventing an overvoltage of the DC circuit section of the inverter 3 and an overcurrent of the inverter.

The electrical angular frequency ω is included as a parameter in the circuit model 18 of the induction motor as shown in Eq. (17). The electrical angular frequency ω corresponds to the summation value of the slip frequency $\omega_{se}$ and a value that is the product of the motor rotational speed and the number of pairs of the motor poles. The value of the electrical angular frequency ω thus varies with the motor rotational speed, and the frequency transfer characteristic of the circuit model 18 of the induction motor expressed by Eq. (17) varies with the motor rotational speed. For this reason, by changing appropriately the setting of the control system in response to the motor rotational speed or the command frequency, the rapid deceleration control of the motor can be quickly achieved while preventing an overvoltage of the DC circuit section of the inverter 3 and an overcurrent of the inverter.

Embodiment 3

While an induction motor is exemplarily employed in Embodiment 1, the motor deceleration controller 14 can also be applied to other type of motor. Here, a model corresponding to the circuit model 18 of the induction motor shown in FIG. 4 is considered for a permanent magnet synchronous motor. In a case of the permanent magnet synchronous motor, no temporal variation occurs in the secondary magnetic flux because it is being established. Further, since the primary (stator) circuit model of the permanent magnet synchronous motor is the same structure as that of the induction motor, the circuit model is expressed similarly to Eq. (17) by Eq. (18):

$$i_{ds} = \frac{1}{L} \frac{\left(s + \frac{R}{L}\right)}{\left(s + \frac{R}{L}\right)^2 + \omega^2} \cdot V_{ds}, \tag{18}$$

where R is resistance of the motor armature; and L, inductance thereof.

For that reason, substantially the same discussion on the design procedures of each control block in the motor deceleration controller 14 established for the induction motor is applicable to the permanent magnet synchronous motor. Thus, the present invention has the merit of being applicable to any type of motor for a case of rapid deceleration performed by increasing motor loss by amplifying the command voltage during deceleration control.

Embodiment 4

While in Embodiment 1, the motor loss is increased for the rapid deceleration control of the motor by the motor deceleration controller 14, the increase of the motor loss can be utilized in the following situation. That is, a warm-up operation of a motor can be performed by taking advantage of the feature of rapid increase of motor loss. In an induction motor, parameter values that vary with motor temperature, such as the primary resistance value and the secondary resistance value thereof, are used for calculation of a slip frequency, estimation of secondary magnetic flux, and the like. Also in a permanent magnet synchronous motor or the like, the primary resistance value is a parameter necessary for constituting a sensorless control system.

The reason for performing the warm-up operation is as follows. These parameter values to be used are generally determined assuming an ordinary operating condition at a prescribed room temperature. For example, when a motor is started in winter season, the motor case is cold and the resistance value is smaller than the determined value stored in the controller. This causes an error. As a result, a malfunction may occur in some cases, such as a torque error and an error in estimation of the secondary magnetic flux for an induction motor, and an error in the speed estimated by a sensorless control system for a permanent magnetic synchronous motor. In particular, in a case of estimating the secondary magnetic flux, when the primary resistance value and the secondary resistance value of the motor become smaller than those stored in the controller, stability of the overall control system may be compromised in some cases.

For that reason, a preliminary warm-up operation before full operation by increasing motor loss using the motor deceleration controller 14 can eliminate the malfunction.

It should be noted that each embodiment of the present invention may be freely combined, or appropriately modified or omitted within the spirit and scope of the invention.

REFERENCE NUMERALS

1: DC power source;
2: smoothing capacitor;
3: inverter;
4: current detector;
5: motor;
6: motor control device;
7: command frequency generator;
8: command frequency;
9: V/f converter;
10: command voltage amplitude (before compensation);
11: voltage signal across the DC circuit section of the inverter;
12: PWM modulator;
13: switching command;
14: motor deceleration controller;
14a: command voltage-amplitude amplification-factor setting function;
14b: before-filtered command voltage-amplitude amplification factor (during deceleration control) A1;
14c: before-filtered command voltage-amplitude amplification factor (during no deceleration control) A2;
14d: selector;
14e: low-pass filter;
14f: first command voltage-amplitude amplification factor;
14g: current amplitude calculator;
14h: current amplitude signal;
14i: current amplitude limit value;
14j: PI controller;
14k: second command voltage-amplitude amplification factor;
14l: adder;
14m: third command voltage-amplitude amplification factor;
14n: multiplier;
14o: excitation controller;
14p: motor current controller;
14q: command voltage signal (perturbation) to DC circuit section;
15: detected current signal;
16: deceleration processing execution command;
17: command voltage amplitude (after compensation);
18: circuit model of induction motor;
19: mechanical model;
20: motor rotational speed (perturbation);
21: motor input power (perturbation);
22: smoothing capacitor current (perturbation);
23: gain;
24: gain;
25: voltage model of DC circuit section;
26: deceleration processing execution command output component

The invention claimed is:

1. A motor control device comprising:
a motor deceleration controller configured to receive a deceleration processing execution command to enable a deceleration control of a motor and a command voltage amplitude for an inverter, to control deceleration of the motor using the inverter,
the motor deceleration controller including:
an excitation controller to receive the deceleration processing execution command and a voltage signal across a DC circuit section of the inverter, to calculate a first command voltage-amplitude amplification factor used for a rapid deceleration control of the motor;
a motor current controller to receive a motor current signal and a current amplitude limit value that is a limit value of current applicable to the inverter, and the motor, to calculate a second command voltage-amplitude amplification factor used for suppressing an overcurrent;
an adder to add the first command voltage-amplitude amplification factor and the second command voltage-amplitude amplification factor, to output a third command voltage-amplitude amplification factor used for the rapid deceleration control of the motor; and
a multiplier to multiply the command voltage amplitude by the third command voltage-amplitude amplification factor, to output a multiplied command voltage amplitude,
wherein the inverter is controlled in accordance with the command voltage amplitude multiplied by the multiplier, and
wherein the excitation controller receives the deceleration processing execution command and the voltage signal across the DC circuit section of the inverter, to calculate, based on the voltage signal, the first command voltage-amplitude amplification factor to be used for the rapid deceleration control of the motor using a command voltage-amplitude amplification-factor setting function.

2. The motor control device of claim 1, wherein the excitation controller selects a before-filtered command voltage-amplitude amplification factor for the deceleration control, which factor is an output of a function of the voltage signal across the DC circuit section of the inverter, when the deceleration control is enabled by the deceleration processing execution command or selects another before-filtered command voltage-amplitude amplification factor for no deceleration control when the deceleration control is disabled, and performs a low-pass filter processing for the selected before-filtered command voltage-amplitude amplification factor, to output the processed amplification factor as the first command voltage-amplitude amplification factor.

3. The motor control device of claim 1, wherein the motor current controller includes:
a current amplitude calculator to calculate an amplitude of the motor current signal; and
a PI controller to receive a difference between the current amplitude signal calculated by the current amplitude calculator and the current amplitude limit value, to output the second command voltage-amplitude amplification factor.

4. The motor control device of claim 2, wherein a cut-off frequency of the low-pass filter processing in the excitation controller and a gain of a PI controller in the motor current controller are set based on a command frequency or a motor rotational speed at a start of the deceleration control of the motor.

5. The motor control device of claim 2, wherein a cut-off frequency of the low-pass filter processing in the excitation controller and a gain of a PI controller in the motor current controller are set based on a spec value of a maximum rotational speed of the motor.

6. The motor control device of claim 2, wherein a cut-off frequency of the low-pass filter processing in the excitation controller and a gain of a PI controller in the motor current controller are set during the deceleration control of the motor based on a motor rotational speed or a command frequency.

7. The motor control device of claim 1, wherein a warming up operation of the motor is performed by increasing loss of the motor using the motor deceleration controller.

8. The motor control device of claim 1, wherein the command voltage-amplitude amplification-factor setting function increases the first command voltage-amplitude amplification factor when the voltage signal exceeds a threshold voltage.

* * * * *